Patented Nov. 25, 1952

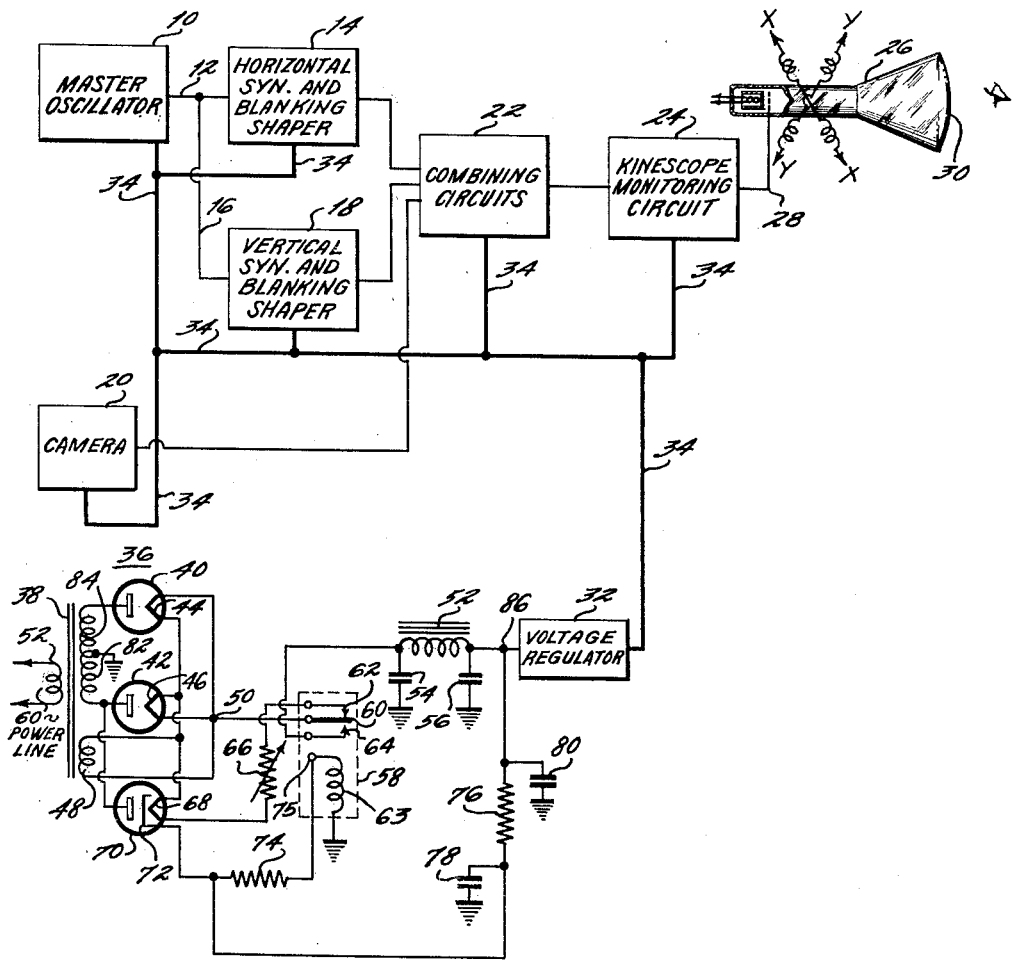

2,619,525

UNITED STATES PATENT OFFICE 2,619,525

PROTECTED TIME DELAY POWER SUPPLY SYSTEM

Richard C. Webb, Ames, Iowa, assignor to Radio Corporation of America, a corporation of Delaware Application March 15, 1950, Serial No. 149,841

4 Claims. (Cl. 175—329)

The present invention relates to protective arrangements for power supply systems and more particularly, although not necessarily exclusively, to a combination time delay and overload protected power supply arrangement for use with electronic circuits.

It is well-known that in some electrical circuits employing electron discharge tubes, sometimes referred to as radio tubes, special precautions should be taken in applying operating potentials. The common radio tube usually comprises a heater, cathode, and anode. When power is supplied to the heater the temperature of the cathode is also raised along with that of the heater. A delicate material placed on the cathode then emits electrons. As soon then, as positive potential is applied to the anode, the electrons from the cathode are drawn to the anode to produce an electronic flow within the tube. However, some cathodes are so delicate that they will be damaged if not sufficiently heated before positive potential is applied to the anode.

The above considerations also apply to some discharge tubes having no cathodes. In such tubes the delicate material which emits electrons is placed directly on the heater itself.

Furthermore, when electron discharge tubes are used for rectifying alternating voltage particular care must be taken. In such applications the discharge tube is subjected to rather high currents. This additional current makes the possible damage to the heater or cathode even greater. Therefore, in rectifier power supply circuits, it is often desirable to withhold application of the full load to the rectifier circuit until such time as the heaters of the rectifier discharge tubes have reached maximum temperature.

It is, therefore, an object of the present invention to provide a novel time delay switching circuit for power supply systems. The switching circuit automatically waits until the heaters of the discharge tubes to be protected have reached a safe operating temperature. Then the switching device actuates to apply potential from the source of voltage supply to the discharge tube anodes.

It is further well-known that certain rectifier type power supplies for producing B+ power potential to electronic circuits tend to develop rather high voltages when not sufficiently loaded. Accordingly, where rectifier circuits of this kind are used to supply electron tube circuit power requirements, additional difficulties are sometimes encountered. When first "turning on" the electronic circuit supplied by the rectifier power supply, the electron tube filaments or heaters are cold. These must heat up sufficiently to emit electrons before the electron tubes will pass current. Therefore, there is an interval when the power supply is virtually unloaded. If now there are any filter capacitors in the power supply itself, these filter capacitors are subjected to higher than normal voltages. If the voltage, to which the unloaded power supply rises, is sufficient, these filter capacitors may break down and become useless.

It is another object of the present invention to provide an automatic protective switching circuit for connection between the rectifier tubes of a power supply and the filter capacitor section of a power supply. This automatic switch will interrupt application of voltages to the filter capacitors until such time as the electron discharge tubes in the circuit requiring power have reached a fully heated condition.

In addition to the above objects, the present invention also provides a novel overload protective feature. Thus, should a short circuit occur in the load circuit connected with the power supply, an automatic protective action takes place. The above mentioned switching device is arranged to open under overload conditions and remove the potential to the electronic load circuit. This automatically sets the time delay feature of the circuit into operation again which ultimately will close the switching device. Upon closing, however, the invention senses the overload and opens the switching circuit again. Repeated action of this kind signals the operator that something is wrong.

The present invention, in one of its more general forms, contemplates the use of a relay and a time delay device. The time delay device has power input terminals and power output terminals and is arranged so that voltage occurs at its output terminals only after a predetermined time has elapsed after first applying voltage to the input terminals. The relay is then provided with two circuit paths. One normally open and the other normally closed. The normally open path is placed between the rectifier tube section of a power supply circuit and its associated filter capacitors. The normally closed circuit path is connected between the input terminals of the time delay device and a source of power therefor. The output terminals of the time delay device are then connected for actuating the relay upon the appearing of a voltage thereacross. Finally, a connection between the output of the power supply and the actuating terminals of the relay is made so that once the relay is closed the voltage across the filter condensers will conditionally maintain the relay in this condition.

The above objects and features of the present invention are only exemplary of a few of its advantages and uses. Other uses and features of advantages will occur to those skilled in the art when reading the following more detailed description, especially when taken in connection with the drawing which illustrates, by a combination block and schematic diagram, the application of the present invention to an electronic apparatus for generating television wave forms. The power consuming apparatus shown is commonly referred to as a television synchronizing signal generator.

We shall now consider the drawing in more detail. In the upper portion of the figure there are illustrated, by block diagram, the well-known components of a television synchronizing signal generator. The master oscillator 10 is connected via circuit path 12 for supplying signal to the horizontal sync and blanking shaper circuit 14. Also, master oscillator 14 is connected via circuit path 16 for supplying signal to the vertical sync and vertical blanking shaper 18. A television camera is illustrated at 20. The output signal of the camera 20 is combined with the output of the horizontal and vertical sync and blanking circuits 14 and 18 by means of a combining circuit 22. The output of the combining circuit 22 is then connected with a kinescope monitoring circuit 24 via circuit 24. The kinescope 26 is supplied with the output of the circuit 24 via the circuit path 28 so that an image will appear on the face 30 of the kinescope. This image corresponds to that which the camera 20 picks up. A more detailed description of such a synchronizing signal generator may be had through reference to the paper by J. P. Smith and A. V. Bedford appearing in the RCA Review for July 1940, volume 5, pages 51–68, "A Precision Synchronizing Signal Generator." This article also illustrates suitable circuitry for use in the indicated block representations of the figure. The actual sync signal generator indicated is merely exemplary of one form of power consuming device and really forms no part of the present invention. The present invention is concerned only with the supply of B power to operate such a circuit. Thus, the B power supply terminals of all the components of the sync synchronizing generator have been shown and connected by dark lines to the output of a voltage regulator shown at 32. This B power supply circuit has been indicated as 34 throughout the figure.

Now, in order to develop B power supply potential for bus 34, a somewhat conventional full wave rectifier circuit is shown at 36. The conventional features of this circuit comprise a transformer 38, rectifier tubes 40 and 42 having their heaters 44 and 46 respectively connected to a heater transformer winding 48. D. C. output potential will then appear at the power supply output terminal 50 when 60 cycle power is applied to the primary 52 of the transformer 38. A typical inductance-capacity filtering circuit comprising choke 52 and capacitors 54 and 56 is also indicated as being connected with the input of the voltage regulator 32.

According to the present invention, a relay 58 is provided as shown in the figure. The armature 60 forms a normally closed circuit path with the contact 62. When the actuating coil 63 of the relay is sufficiently energized, the armature 60 then leaves contact 62 and operates to close a second circuit path by touching the lower contact 64 of the relay.

In further accordance with the present invention, the terminal 50 of the rectifier circuit is connected with the armature 60 so that upon closing of the relay 58, the voltage at terminal 50 will be applied to the filter circuit inductance 52. The relay, in its normally open and deactuated position, allows the voltage at 50 to be connected to contact 62 of the relay, which, via resistance 66, completes the heater circuit for the heater 68 of an additional rectifier tube 70. Thus, when the relay 58 is in its resting or deactuated position, the filament or heater supply voltage developed across winding 48 of the transformer is applied to all of the heaters 44, 48 and 68 at the same time. The cathode 72 of the rectifier 70 is connected through resistor 74 to an actuating terminal 75 of the relay 58. Actuating terminal 75 is also connected through the resistor 74 and through resistance 76 to the input terminal of the voltage regulator 32. Suitable filter bypass and time constant capacitors 78 and 80 are provided across the resistance 76.

The operation of the present invention is substantially as follows: When power is applied to the primary winding 52 of the transformer 58, a heater voltage appears across transformer winding 48. This heater voltage being applied to the heaters 44 and 46 begins to heat the rectifier tube 40 and 42. The contacts 60 and 62 of relay 58 being normally closed allow the heater 68 of the added rectifier 70 to also heat. The rate at which the heater 68 heats may be controlled by the series resistance 66. Once the tube 70 has heated sufficiently, an electronic flow will be established within the tube, which flow will represent rectification of the voltage appearing across section 82 of the transformer high voltage winding 84. This current flow through the tube 70 will pass via resistance 74 through the coil 63 of the relay 58. After tube 70 heats up further, the current through the coil 63 will increase until the voltage at actuating terminal 75 reaches a value C, which is the voltage necessary for the relay 58 to actuate or close. Upon closing, contacts 60 and 64 will "make," thereby connecting terminal 50 with the input terminal 86 of the voltage regulator 32 through the filter inductance 52. Voltage will then be applied via resistors 76 and 74 to the actuating terminal 75 of the coil 64. By properly adjusting the values of resistors 76 and 74, the relay 58 will be maintained in a closed position.

It will thus be seen that by adjusting the rate at which tube 70 heats up, any given time delay may be interposed between the application of power to the transformer 38 and the actual application of voltage to the regulator 32. This time delay is, as learned above, adjustable by variable resistor 66 and may be made sufficient to allow complete heating of the rectifier tube 40 and 42 as well as the electron tubes in the sync generator before power is supplied to the sync generator. The electron emissive surfaces of the tubes 40 and 42 are thereby protected. Since the tubes in the sync generator have warmed up completely, a maximum load will be placed on the voltage regulator 32 so that the voltage across capacitors 54 and 56 will not be damagingly high when the relay 58 first closes.

In further accord with the present invention, by properly adjusting the value of resistors 76 taken in combination with resistor 74, an overload protection action may be obtained by means of relay 58. For example, it is well-known that certain magnetic relays upon actuation will maintain actuation at a much lower voltage (voltages above D) than that required to initially close it (voltages above C). Thus, the resistance 76 is adjusted so that upon closing of the relay 58, a voltage above D will be applied to the actuating terminal 75 of just sufficient value to maintain the relay closed. If an overload occurs in the sync generator circuit, the voltage regulator 32 will demand more current and the voltage at terminal 86 will necessarily drop due to the resistance inherent in the system. This will allow the sustaining voltage applied to terminal 75 of the relay, to also drop below D and thereby cause the relay 58 to return to its normal or deactuated position. When this happens, terminals 60 and 62 contact each other to start the reheating of the added rectifier tube 70 which has, in the interim, cooled. Through underload conditions the combination time delay and relay circuit of the present invention will continue to recycle itself until the overload is corrected. This recycling will call the operator's attention to the irregularity.

It will be appreciated that the added rectifier tube 70 in the embodiment of the present invention shown in the figure can be replaced by any time delay circuit having an output terminal adapted for supplying voltage to the relay 58. Furthermore, the single pole double throw relay 58 may be replaced by many other forms of relay either mechanical or electronic, which will provide the necessary circuit path switching. The presence of the filter circuit 52 is, of course, optional. Furthermore, if regulation of the voltage applied to the B+ power supply bus 34 is not mandatory, the voltage regulator 32 may be omitted.

It may be further noted that the overload protective action of the present invention is of utility regardless of the form of time delay device used. The time delay device 70, as far as the overload feature of the present invention is concerned, may well be replaced by any means for conditionally closing relay 58 subsequent to its deactuation by overload conditions.

Having thus described my invention, what I claim is:

1. An electric protection circuit for a utilization circuit having an input terminal, comprising in combination a power supply having an output terminal, a time delay device having an input terminal and an output terminal, a relay having an actuating terminal, an armature, a normally open contact and a normally closed contact, a connection between the power supply output terminal and the relay armature, a connection between the time delay device input terminal and the relay's normally closed contact, a connection between the relay's normally open contact and the input terminal of the utilization circuit, a connection between the relay's actuating terminal and the output terminal of the time delay device, and a connection between the relay's actuating terminal and the input terminal of the utilization circuit.

2. An electric protection circuit according to claim 1 wherein said relay is adapted to actuate in response to actuating terminal voltages above value "C" and deactuate in response to actuating terminal voltages below value "D," said connection between the relay's actuating terminal and the output terminal of the time delay device is arranged to apply to said actuating terminal a voltage above value "C," and said connection between the relay's actuating terminal and the input terminal of the utilization circuit is arranged to apply to said actuating terminal a voltage above value "D" under normal load conditions of said utilization circuit and below value "D" under overload conditions of said utilization circuit.

3. An electric protection circuit according to claim 2 wherein the time delay device comprises an electron discharge tube having a heater and two electrodes, the input terminal of said time delay device being connected to the heater of said electron discharge tube and its output terminal being connected to an electrode of said electron discharge tube.

4. An electric protection circuit for a utilization circuit having an input terminal, comprising in combination a power supply having an output terminal, a time delay device having an input terminal and an output terminal, a relay having an actuating terminal, an armature, a normally open contact and a normally closed contact, a connection between the power supply output terminal and the relay armature, a connection between the time delay device input terminal and the relay's normally closed contact, a connection between the relay's normally open contact and the input terminal of the utilization circuit, a connection between the relay's actuating terminal and the output terminal of the time delay device, and a connection including a resistance between the relay's actuating terminal and the input terminal of the utilization circuit.

RICHARD C. WEBB.

REFERENCES CITED

The following references are of record in the file of this patent:

UNITED STATES PATENTS

| Number | Name | Date |
| --- | --- | --- |
| 2,047,127 | Huber | July 7, 1936 |
| 2,073,701 | Lazzarini | Mar. 16, 1937 |
| 2,143,501 | Snyder | Jan. 10, 1939 |
| 2,248,821 | Hasselton et al. | July 8, 1941 |
| 2,356,269 | Potter | Aug. 22, 1944 |
| 2,360,721 | Rose | Oct. 17, 1944 |
| 2,471,976 | Potter | May 31, 1949 |